(12) United States Patent
Zhu et al.

(10) Patent No.: US 9,577,935 B2
(45) Date of Patent: Feb. 21, 2017

(54) UNIFIED CONGESTION CONTROL FOR REAL-TIME MEDIA SUPPORT

(71) Applicant: Cisco Technology, Inc., San Jose, CA (US)

(72) Inventors: Xiaoqing Zhu, Austin, TX (US); Rong Pan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 14/252,974

(22) Filed: Apr. 15, 2014

(65) Prior Publication Data

US 2015/0295827 A1 Oct. 15, 2015

(51) Int. Cl.
| | |
|---|---|
| H04L 12/801 | (2013.01) |
| H04L 12/927 | (2013.01) |
| H04L 12/841 | (2013.01) |
| H04L 12/811 | (2013.01) |
| H04L 29/06 | (2006.01) |

(52) U.S. Cl.
CPC .............. H04L 47/12 (2013.01); H04L 47/11 (2013.01); H04L 47/283 (2013.01); H04L 47/38 (2013.01); H04L 47/801 (2013.01); H04L 65/80 (2013.01)

(58) Field of Classification Search
CPC .... H04L 45/125; H04L 145/302; H04L 45/70; H04L 47/29; H04L 12/1432; H04L 12/141; H04L 12/1417
See application file for complete search history.

(56) References Cited

U.S. PATENT DOCUMENTS

| | | |
|---|---|---|
| 8,665,281 B2 | 3/2014 | Khan |
| 8,670,324 B2 | 3/2014 | Cheung |
| 8,676,993 B1 | 3/2014 | Zhao |

OTHER PUBLICATIONS

Zhu et al. "NADA: A Unified Congestion Control Scheme for Real-Time Media, draft-zhu-rmcat-nada-01," Mar. 12, 2013, IETF.*
Zhu et al. "NADA: A Unified Congestion Control Scheme for Real-Time Media, draft-zhu-rmcat-nada-02," Sep. 11, 2013, IETF.*
Zhu et al. "NADA: A Unified Congestion Control Scheme for Real-Time Media, draft-zhu-rmcat-nada-03," Mar. 13, 2014, IETF.*
Zhu et al. "NANA A Unified Congestion Control Scheme for Low-Latency Interactive Video," Dec. 13, 2013, IEEE.*
Zhu et al. "NANA A Unified Congestion Control Scheme for Low-Latency Interactive Video," Dec. 2013, Cisco.*

* cited by examiner

*Primary Examiner* — Jae Y Lee
(74) *Attorney, Agent, or Firm* — Fernando & Partners, LLP

(57) ABSTRACT

Various implementations disclosed herein enable congestion control systems and methods that are agnostic of the availability of congestion notification types, and are simultaneously responsive to multiple types of network congestion indicators—including both implicit (e.g., loss and delay) and explicit (e.g., marking) congestion indicators. For example, some implementations include a congestion control method that includes obtaining a composite congestion indicator value associated with multiple types of network congestion indicators, and determining a reference rate value based on a function of the composite congestion indicator value. The composite congestion indicator value represents a combination of one or more delay values associated with respective types of network congestion indicators. The reference rate value is representative of a baseline transmission rate from the first device that at least partially mitigates network congestion signaled by the network congestion indicators.

20 Claims, 7 Drawing Sheets

UNIFIED CONGESTION CONTROL FOR REAL-TIME MEDIA SUPPORT

TECHNICAL FIELD

The present disclosure generally relates to data networks, and in particular, to enabling congestion management that is responsive to multiple congestion notification types.

BACKGROUND

The ongoing development of data networks includes improving low-latency real-time media services such as a video conferencing. The rapid growth in the popularity of video conferencing services is indicative of demand for interactive data rich media services. However, despite extensive research and development in the areas of video encoding and networking technologies, it remains an elusive task to support low-latency interactive video over shared networks (e.g., public portions of the Internet) with satisfactory service quality.

Network congestion is often a factor that limits or deteriorates the perceptual quality of video conferencing services. Network congestion often occurs when a network node transmits a data flow at a rate that is greater than the available capacity of the network to handle the data flow on one or more network links. Network capacity is sometimes limited at data bottleneck points where multiple data flows demand access to a link over which bandwidth is limited relative to the instant demand of the multiple data flows. For example, cable modems serving multiple client devices are frequently bottleneck points. Data queues are used to gate throughput onto the link at such points to regulate traffic and avoid packet collisions. However, queues add delay and can overflow when an incoming rate of a data flow is greater than the output rate of the queue. In turn, the effects of network congestion include queuing delays, packet loss and difficulty in establishing new connections between network nodes. Due to such effects, incremental increases in traffic load can lead either to relatively small increases in network throughput or even to a reduction in network throughput for existing data flows.

Low-latency interactive real-time media services, such as video conferencing, also present additional challenges for congestion control. For example, often to a greater extent than for TCP, performance of a transport mechanism for such services is assessed on how well it: adapts to abrupt changes in available bandwidth; accommodates sluggish responses and output rate fluctuations of a transmit-side live video encoder; and avoids high queuing delays.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
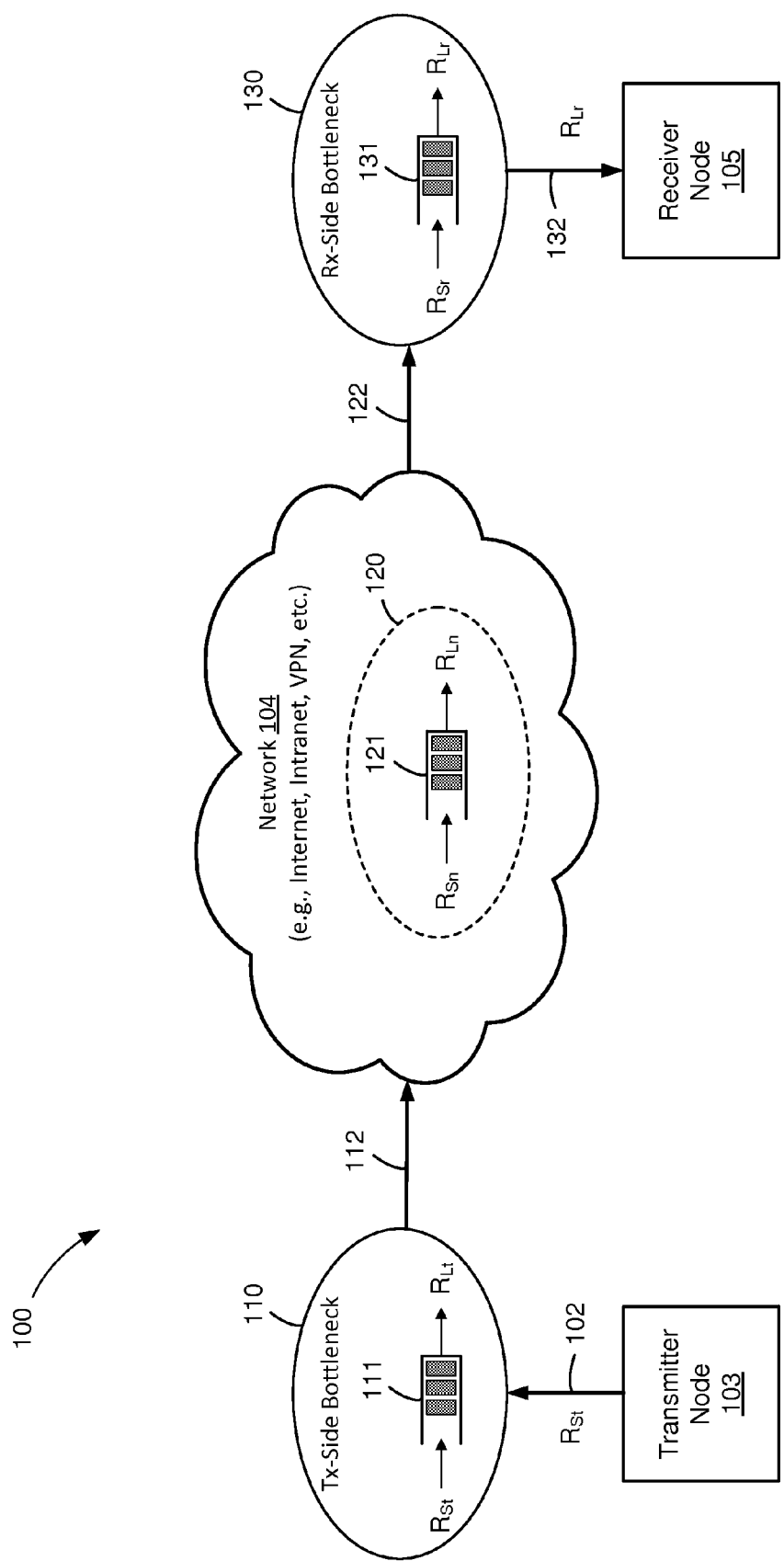
FIG. 1 is a schematic diagram of a congestion model for a data communication environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Indeed, the novel methods and systems described herein may be embodied in a variety of other forms. Furthermore, various omissions, substitutions and changes in the form of the methods and systems described herein may be made without departing from the scope of protection. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein enable congestion control systems and methods that are agnostic of the availability of congestion notification types, and are simultaneously responsive to multiple types of network congestion indicators—including both implicit (e.g., loss and delay) and explicit (e.g., marking) congestion indicators. For example, some implementations include a congestion control method that includes obtaining a composite congestion indicator value associated with multiple types of network congestion indicators, and determining a reference rate value based on a function of the composite congestion indicator value. The composite congestion indicator value represents a combination of one or more delay values associated with respective types of network congestion indicators. The reference rate value is representative of a baseline transmission rate from the first device that at least partially mitigates network congestion signaled by the network congestion indicators.

FIG. 1 is a diagram of a congestion model 100 for a data communication environment in accordance with some implementations. While pertinent features are shown, various other features known to those of ordinary skill in the art have not been illustrated for the sake of brevity and so as not to obscure more pertinent aspects of the example implementations disclosed herein. To that end, the congestion model 100 includes a transmitter 103, transmission-side (Tx-side)

bottleneck point 110, a network 104, a receiver-side (Rx-side) bottleneck point 130, and a receiver 105.

The transmitter 103 is coupled to enable communication to the transmission-side bottleneck point 110 through transmission link 102. The transmission-side bottleneck point 110 is coupled to enable communication to the network 104 through transmission link 112. In some implementations, the transmission-side bottleneck point 110 includes a queue 111 to regulate traffic and avoid packet collisions on the transmission link 112. The network 104 is coupled to enable communication to the receiver-side bottleneck point 130 through transmission link 122. In some implementations, the network 104 includes at least one queue (e.g., queue 120) provided to regulate traffic and avoid packet collisions within the network 104 and/or on the transmission link 122. Receiver-side bottleneck point 130 is coupled to enable communication to the receiver 105 through transmission link 132. In some implementations, the receiver-side bottleneck point 130 includes a queue 131 to regulate traffic and avoid packet collisions on the transmission link 132. While data traffic from the transmitter 103 to the receiver 105 is illustrated and described as unidirectional, those of ordinary skill in the art will appreciate from the present disclosure that this simplified description is merely provided to present more pertinent aspects of various implementations, and that bidirectional communication between network nodes is supported in accordance with various implementations. Moreover, those of ordinary skill in the art will also appreciate that the congestion model 100 illustrated FIG. 1 is intended to serve as a functional description rather than as a structural schematic of a particular implementation of a data communication environment.

In various implementations, the network 104 is any LAN and/or WAN, such as an intranet, an extranet, a virtual private network, or at least a portion of the Internet. In some implementations, the network 104 provides communication capability between any number of network nodes and one or more third party content servers and/or service servers. In some implementations, the network 104 provides communication capability between any number of client devices and one or more private content servers, storage devices, gateways and/or service servers. In some implementations, the network 104 uses Real-Time Transport Protocol (RTP) to transmit video encoded data packets. In some implementations, the network 104 uses Real-Time Transport Control Protocol (RTCP) to support video conferencing services and/or other interactive data rich media services that demand low-latency transport to achieve a satisfactory perceptual quality level. However, implementations are not limited to the use of any particular transport protocol.

The transmission-side bottleneck point 110 is representative of a first network node that is proximate to the transmitter 103. The first network node is configured to manage access to the transmission link 112, and thus becomes a data traffic bottleneck point when demand for link access is greater than the available bandwidth over the transmission link 112. Similarly, the receiver-side bottleneck point 130 is representative of a second network node that is proximate to the receiver 105. The second network node manages access to transmission link 132, and thus becomes a data traffic bottleneck point when demand for link access is greater than the available bandwidth on the transmission link 132. More generally, one or more bottleneck points (e.g., bottleneck point 120) may exist at any arbitrary point within the network 104 between the transmitter 103 and the receiver 105.

In operation, the transmitter 103 transmits a data flow at rate $R_{St}$ towards the transmission-side bottleneck point 110 through transmission link 102. The data flow, received by the transmission-side bottleneck point 110 at the incoming rate $R_{St}$, is directed through the queue 111. The data flow is subsequently transmitted from the queue 111 at an output rate RD onto transmission link 112. The data flow, which is received by the arbitrarily-located network bottleneck point 120 at the incoming rate $R_{Sn}$, is directed through the queue 121. The data flow is then transmitted from the queue 121 at an output rate $R_{Ln}$ onto transmission link 122. The data flow, subsequently received by the receiver-side bottleneck point 130 at the incoming rate $R_{Sr}$, is directed through the queue 131. The data flow is then transmitted from the queue 131 at an output rate $R_{Lr}$ onto transmission link 132 to receiver 105.

Network congestion can occur at one of the bottleneck points (e.g., 110, 120, 130) when a respective incoming rate (i.e., $R_{St}$, $R_{Sn}$, $R_{Sr}$) is greater than the available bandwidth on the corresponding outbound transmission link. Congestion forces the respective outgoing rate (i.e., $R_{Lt}$, $R_{Lt}$, $R_{Lt}$) of the corresponding queue below the respective incoming rate (i.e., $R_{St}$, $R_{St}$, $R_{St}$). Consequently, the respective congested queue adds delay and can overflow, which can lead to packet loss and difficulty in establishing new connections between network nodes.

Previously known congestion management methods are typically finely tuned to be highly responsive to a particular congestion notification type, and are unresponsive to alternative congestion notification types. In order to widen responsiveness to various congestion notification types, previously known congestion control systems utilize mode switching between previously known congestion management methods in order to respond to different congestion notification types that could be provided within a network. In other words, previously known systems rely on identifying the type of congestion notification received and invoking a particular corresponding congestion control management method that is responsive to the received congestion notification type. There are a number of drawbacks to these known systems. For example, known systems cannot respond to congestion notification types without including an implementation of the corresponding congestion management methods. Thus, known systems are not responsively agnostic with respect to the notification types that could be provided within a network. Known systems are also limited to being responsive on a first-in-first-out basis because known systems utilize independent implementations of congestion management methods that are each independently responsive to a particular notification type. Thus, known systems are incapable of concertedly responding to multiple congestion notification types that are received in close temporal proximity to one another.

By contrast, implementations of congestion control described herein are agnostic of the available of congestion notification types, and are concertedly responsive to multiple types of network congestion indicators—including both implicit (e.g., loss and delay) and explicit (e.g., explicit congestion notification (ECN) marking) congestion indicators. In particular, various implementations include the integration of one or more network congestion indicators into a composite congestion indicator. The composite congestion indicator is used to simultaneously address one or more factors causing network congestion represented by the one or more network congestion indicators. Some implementations are also configured to address the challenges of providing both relatively high data rates and relatively low queuing delays at steady state. Additionally and/or alternatively, some implementations are configured to respond to abrupt changes in network bandwidth, while also accommodating sluggish responses and output rate fluctuations of a live video encoder for video conference applications. Some implementations, provided as an end-to-end solution for congestion control, are also configured to operate with a wide variety of queue management schemes that may already be implemented in existing networks.

Figure 2:
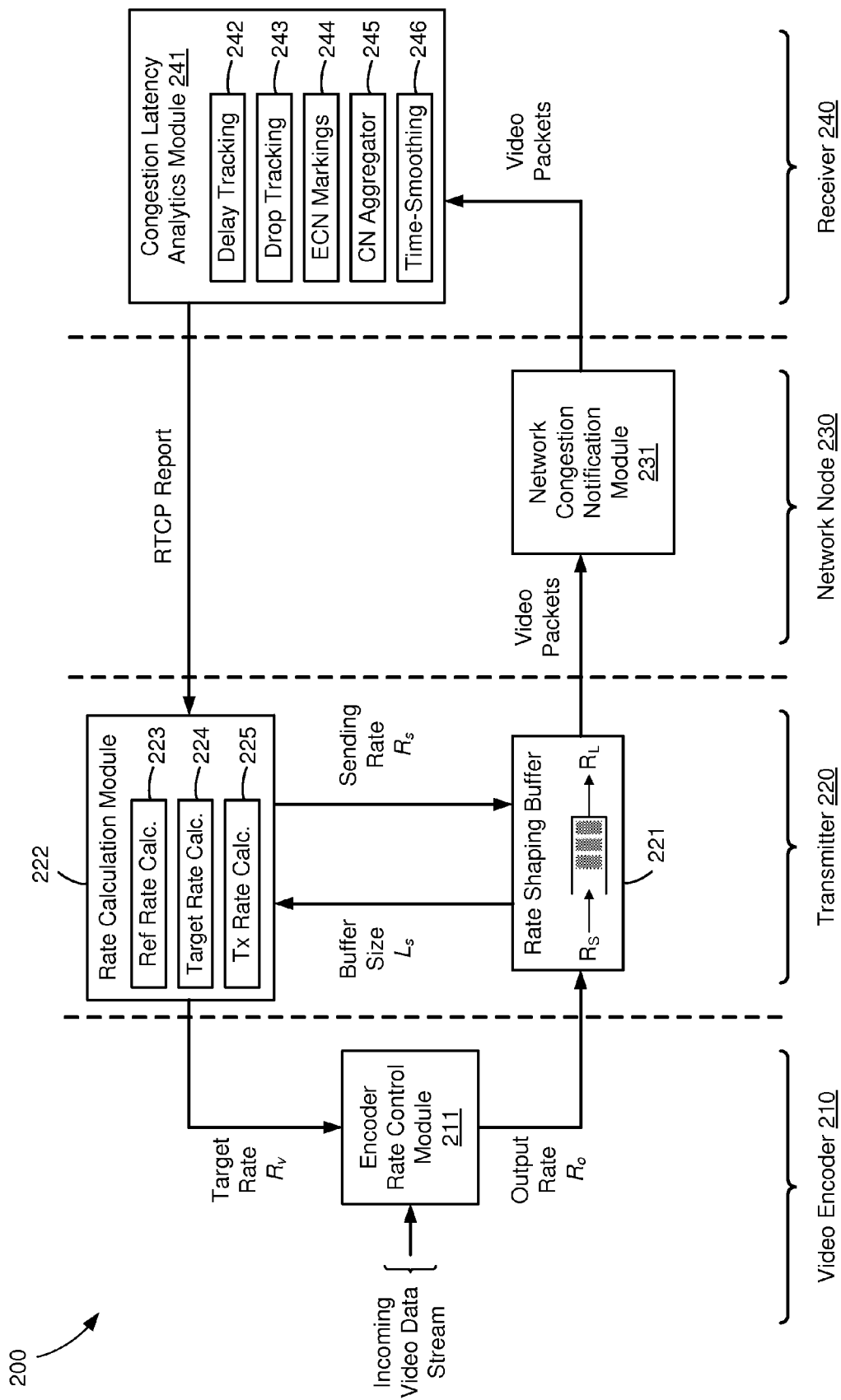
FIG. 2 is a block diagram of a congestion control system in accordance with some implementations.

To that end, FIG. 2 is a block diagram of a congestion control system 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, according to some implementations, the congestion control system 200 includes features implemented in a combination of one or more of a video encoder 210, a transmitter 220, a receiver 240, and one or more network nodes arbitrarily arranged between the transmitter and the receiver 240. Merely for the sake of brevity and convenience of explanation, the functions of the one or more network nodes are described herein as provided by a single entity—namely network node 230 shown in FIG. 2.

Briefly, as described below with reference to FIGS. 2 and 4, the receiver 240 aggregates per-packet drops, ECN markings, and one-way-delay measurements into a composite congestion indicator value $\delta_n$. The receiver 240 periodically transmits a reporting message to the transmitter 220 that includes the composite congestion indicator value $\delta_n$ and/or a time-smoothed composite congestion indicator value $x_n$. In some implementations, the reporting message is transmitted using RTCP or another suitable protocol. As described below with reference to FIGS. 2, 3 and 6, upon receipt of the reporting message, the transmitter 220 determines a reference rate $R_n$ as a function of the congestion signal value $\delta_n$ or $x_n$), a dynamic rate range $[R_{min}, R_{max}]$ associated with the current video content, and a user-specified priority weight w. The transmitter 220 accommodates delayed responses and fluctuations in the output rate $R_o$ of a live video encoder using a local rate shaping buffer 221. Size of the rate shaping buffer $L_s$ exerts an influence on both an outgoing rate $R_s$ of the transmitter 220 and a target rate $R_v$ provided to the live video encoder.

In some implementations, the live video encoder 210 is configured to encode raw video frames into RTP packets (or the like) towards the target rate $R_v$. To that end, in some implementations, the live video encoder 210 includes an encoder rate control module 211 configured to adjust the rate at which RTP packets are produced from the raw video frames. In operation, the actual output rate $R_o$ from the live video encoder 210 typically falls within the dynamic range $[R_{min}, R_{max}]$, which depends on the scene complexity of the incoming video stream (e.g., characterized by a pixel change rate). The actual output rate $R_o$ may also fluctuate randomly around the target rate $R_v$. In some implementations, the reaction time $\tau_v$ of the live video encoder 210 is limited to respond to changes in the target rate $R_v$ over relatively coarse time intervals, sometimes on the order of seconds.

Figure 3:
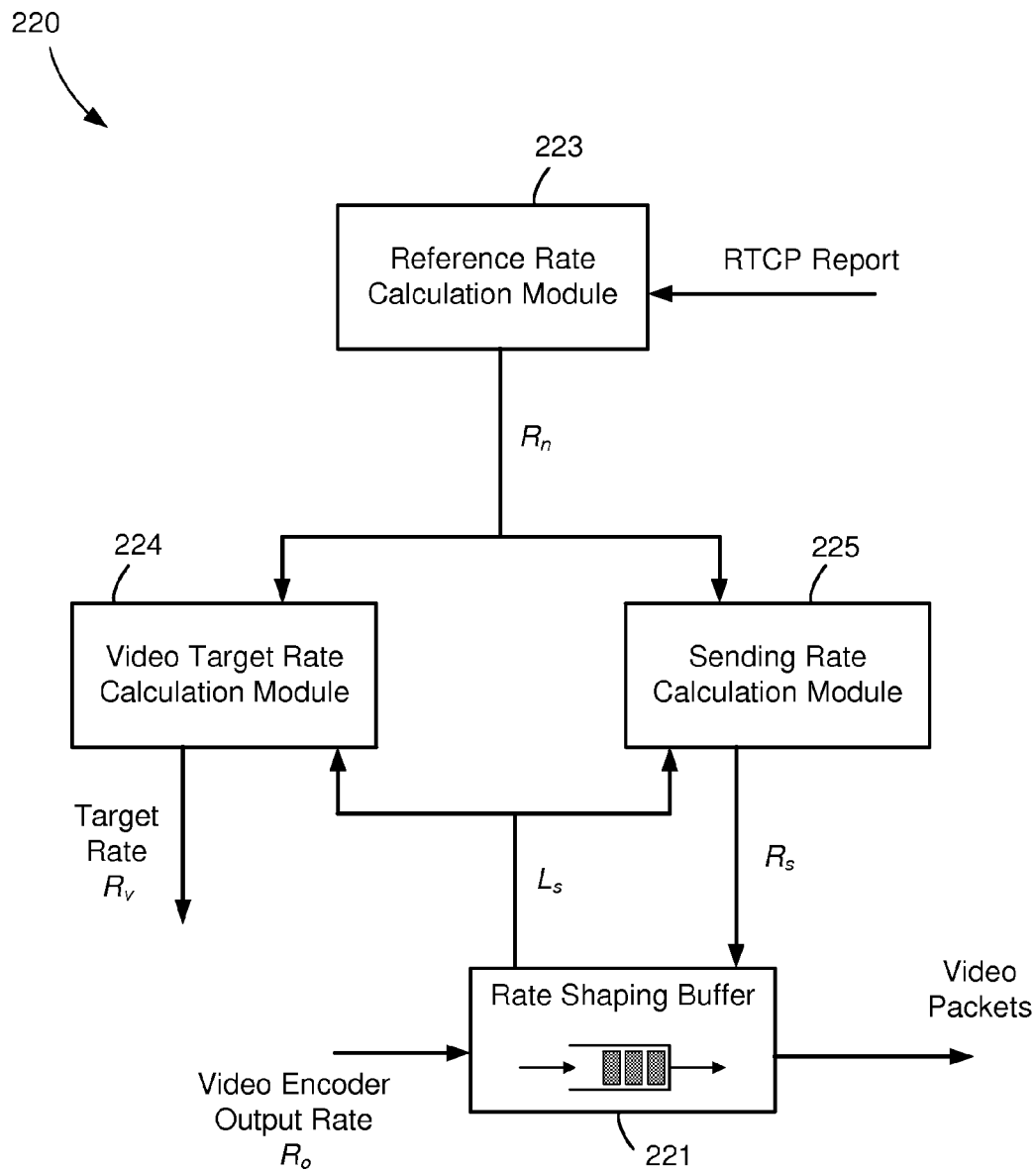
FIG. 3 is a block diagram of a transmitter including a congestion control module in accordance with some implementations.

With continued reference to FIG. 2, FIG. 3 provides a more detailed illustration of the features of the transmitter 220 configured in accordance with some implementations. In some implementations, in addition to transmitting RTP packets into the network, the transmitter 220 is also configured to calculate the reference rate $R_n$ as a function of the congestion signal value $\delta_n$ or $x_n$). To that end, in some implementations, the transmitter 220 includes a rate calculation module 222, which includes a reference rate calculation module 223. Additionally, in some implementations, the rate calculation module 222 includes a target rate calculation module 224 and a sending rate calculation module 225, which are provided to derive the target rate $R_v$ and the sending rate $R_s$ from the reference rate $R_n$. The transmitter 220 also includes the aforementioned rate shaping buffer 221, which is employed to absorb the instantaneous difference between video encoder output rate $R_o$ and the regulated sending rate $R_s$. In a feedback mechanism, as described below with reference to equation (7) and FIG. 6, the buffer size $L_s$, together with the reference rate $R_n$, determines subsequent values of the encoder target rate $R_v$ and the sending rate $R_s$.

In some implementations, the receiver 240 is configured to produce congestion latency analytics that can be used by the transmitter 220 and/or video encoder 210. To that end, in some implementations, the receiver 240 includes a congestion latency analytics module 241 provided to determine equivalent delay values for one or more effects of congestion, which can be combined to produce a composite congestion indicator value $\delta_n$. For example, in some implementations, the congestion latency analytics module 241 includes a delay tracking module 242 configured to track one-way delay $d_n$ of each packet based on timestamps included in RTP packet headers. Additionally and/or alternatively, in some implementations, the congestion latency analytics module 241 includes a packet drop tracking module 243 configured to track packet losses, and provide an indication of an equivalent delay associated with packet losses (e.g., "$1_n{}^L d_L$" as described below with reference to equation (1)). Additionally and/or alternatively, in some implementations, the congestion latency analytics module 241 includes an ECN markings tracking module 244 configured to track per-packet ECN markings (or the like) in the IP packet headers, and provide an indication of an equivalent delay associated with ECN marked packets (e.g., "$1_n{}^M d_M$" as described below with reference to equation (1)). Additionally, in some implementations, the congestion latency analytics module 241 includes a congestion notification aggregator 245 configured to produce a composite congestion indicator value $\delta_n$ from one or more delay values associated with one or more respective types of network congestion indicators. Some implementations also include a time-smoothing module 246 configured to produce a time-smoothed composite congestion indicator value $x_n$, as described below for example with reference to equation (2). The receiver 240 periodically transmits one or more RTP control protocol (RTCP) reporting messages to the transmitter 220 that includes the composite congestion indicator value $\delta_n$ and/or a time-smoothed composite congestion indicator value $x_n$. While FIG. 2 shows the congestion latency analytics module 241 as associated with the receiver 240, in various implementations, one or more functions and/or modules of the congestion latency analytics module 241 are implemented in a transmitter. In some of these implementations the transmitter performs one or more methods described herein enabling congestion control with little or no cooperation with an intended receiver of a data flow.

In some implementations, the various aspects of methods of congestion control described herein are configured to work with different modes of operation of the network node 230. For example, the supported queuing disciplines range from the default behavior of a drop-tail queue, to random early detection (RED), and random early markings based on a token bucket algorithm provided for pre-congestion notification. In various implementations, the methods are adapted to work with methods provided to explicitly control queuing delays such as CoDel and PIE. The network node 230 could also include a network congestion notification module 231 configured to provide ECN markings or the like. The network node 230 could also include explicit congestion information based on virtual queue size and/or virtual queue delay.

Some implementations described herein are configured to support rate adaptation for a single video stream over a potentially time-varying bottleneck link. Some implementations are also configured to support weighted bandwidth sharing among multiple competing video streams. Via distributed and collaborative rate calculations across multiple transmitting nodes configured in accordance with various implementations, a network is enabled to devote more resources to streams that have higher display resolutions, contain more complex or fast-moving video contents, and/or are associated with a higher user-specified priority weighting. Moreover, as described in greater detail below with reference to FIG. 5, since a transmitting node configured in accordance with various implementations are responsive to both network delay and loss information in a unified and simultaneous manner, the transmitting node is able to withstand the coexistence of competing TCP flows in the same bottleneck link queue.

Figure 4:
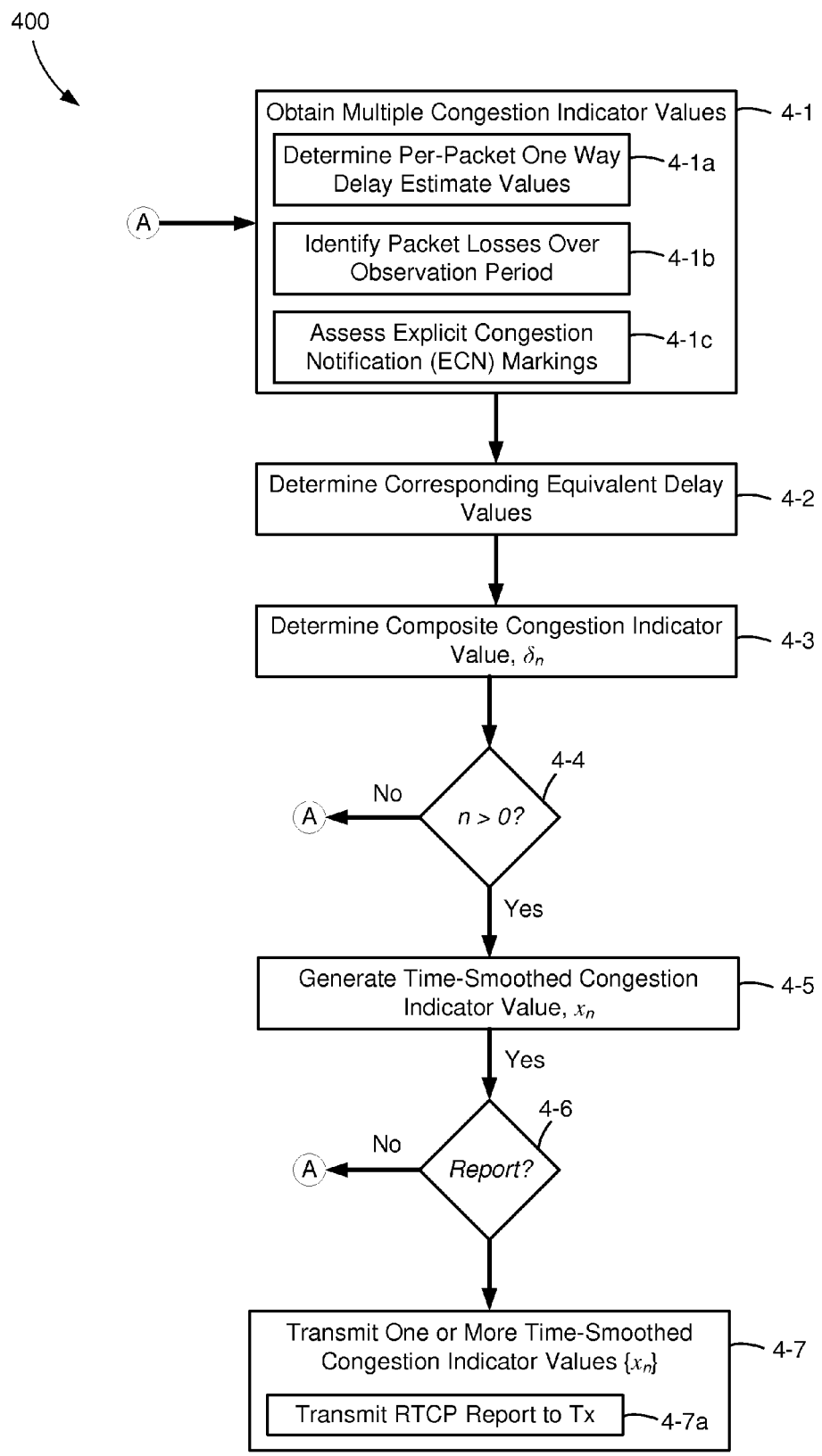
FIG. 4 is a flowchart representation of a receiver method of congestion control in accordance with some implementations.

FIG. 4 is a flowchart representation of a receiver method 400 of congestion control in accordance with some implementations. In some implementations, the method 400 is performed at a network node that is configured to at least one of transmit and receive data in coordination with a communication network. Briefly, the method 400 includes determining one or more respective delay values associated with one or more types of network congestion indicator values, and generating a composite congestion indicator value $\delta_n$. The composite congestion indicator value $\delta_n$ is representative of a combination of one or more respective delay values associated with one or more types of network congestion indicator values.

As represented by block 4-1, the method 400 includes obtaining multiple congestion indicator values. For example, as represented by block 4-1a obtaining multiple congestion indicator values includes tracking a one-way delay estimate $d_n$, of each packet based on timestamps included in packet headers. Additionally and/or alternatively, as represented by block 4-1b obtaining multiple congestion indicator values includes tracking packet losses. For example, as represented by block 4-1c obtaining multiple congestion indicator values includes tracking per-packet ECN markings (or the like) in packet headers.

As represented by block 4-2, the method 400 includes determining equivalent delay values for congestion notification indicators that are not provided as a time value. For example, in some implementations, the equivalent delay for packet loss statistics is provided by $1_n^L d_L$, where $d_L$ is a delay penalty corresponding to an observed packet loss event (e.g., $d_L$=1 second). The term $1_n^L$ is a binary indicator where a value of 1 corresponds to a lost $n^{th}$ packet and a value of 0 indicates no loss. In some implementations the equivalent delay for ECN markings is provided by $1_n^M d_M$, where $d_M$ is a delay penalty corresponding to an observed ECN marking event (e.g., $d_M$=200 msec). The term $1_n^M$ is a binary indicator where a value of 1 corresponds to an ECN marked $n^{th}$ packet and a value of 0 indicates no ECN marking.

As represented by block 4-3, the method 400 includes determining the composite congestion indicator value $\delta_n$ as an equivalent delay value that is a function of the one or more respective delay values. For example, in some implementations, the composite congestion indicator value $\delta_n$ is provided by equation (1) as follows:

$$\delta_n = d_n + 1_n^M d_M + 1_n^L d_L \quad (1)$$

As represented by block 4-4, the method 400 includes determining whether or not previously available values of the composite congestion indicator value $\delta_n$ are available (i.e., whether or not there is at least one previous composite congestion indicator value $\delta_{n-1}$). If there are not previously available values ("No" path from block 4-4), the method circles back to the portion of the method represented by block 4-1. On the other hand, if there are previously available values ("Yes" path from block 4-4), as represented by block 4-5, the method 400 includes generating a time-smoothed congestion indicator value $x_n$ by applying a time-smoothing function to the composite congestion indicator value $\delta_n$. For example, in some implementations, the time-smoothing function is an exponential averaging function provided by equation (2) as follows:

$$x_n = \alpha \delta_n + (1-\alpha) x_{n-1} \quad (2)$$

The weighting parameter $0 < \alpha < 1$ in equation (2) is used to adjust the level of smoothing. In some implementations, a larger value of $\alpha$ encourages faster rate adaptation responsiveness, at the expense of reduced system stability.

As represented by block 4-6, the method 400 includes determining whether or not to report the determined time-smoothed congestion indicator value $x_n$, by for example, determining whether or not a reporting criterion has been satisfied. In some implementations, a reporting criterion is based on at least one of statistical data characterizing the performance of various reporting times and user/system specified reporting time preferences. If a reporting time criterion is not met ("No" path from block 4-6), the method 400 circles back to the portion of the method represented by block 4-1. On the other hand, if the reporting criterion is satisfied ("Yes" path from block 4-6), as represented by block 4-7, the method 400 includes transmitting one or more time-smoothed congestion indicator values $\{x_n\}$. For example, as represented by block 4-7a, transmitting one or more time-smoothed congestion indicator values $\{x_n\}$ includes transmitting one or more RTP control protocol (RTCP) reporting messages.

Figure 5:
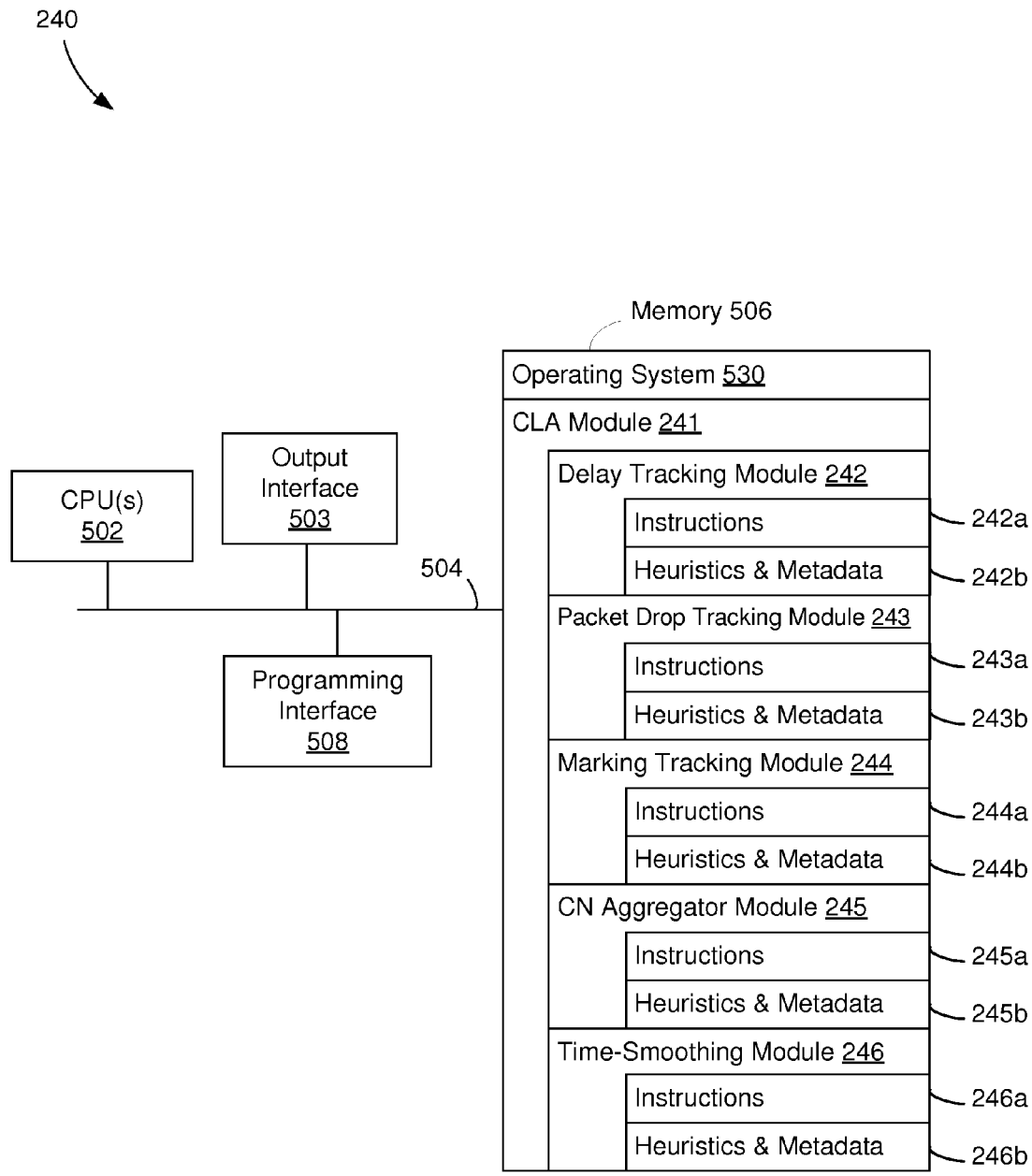
FIG. 5 is a block diagram of a receiver including a congestion control module in accordance with some implementations.

FIG. 5 is a block diagram of the receiver 240 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the receiver 240 includes one or more processing units (CPU's) 502, one or more output interfaces 503, a memory 506, a programming interface 508, and one or more communication buses 504 for interconnecting these and various other components.

In some implementations, the communication buses 504 include circuitry that interconnects and controls communications between system components. The memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium. Moreover, in some implementations, the memory 506 or the non-transitory computer readable storage medium of the memory 506 stores the following programs, modules and data structures, or a subset thereof including an optional operating system 530 and the aforementioned congestion latency analytics module 241. In some implementation, one or more instructions are included in a combination of logic and non-transitory memory.

The operating system 530 includes procedures for handling various basic system services and for performing hardware dependent tasks.

In some implementations, the congestion latency analytics module 241 includes one or more of the delay tracking module 242, the packet drop tracking module 243, the ECN markings tracking module 244, the congestion notification aggregator 245, and the time-smoothing module 246 described above. In order to support the functions described herein, in some implementations, the delay tracking module 242 includes a set of instructions 242a and heuristics and metadata 242b. In order to support the functions described herein, in some implementations, the packet drop tracking module 243 includes a set of instructions 243a and heuristics and metadata 243b. In order to support the functions described herein, in some implementations, the ECN markings tracking module 244 includes a set of instructions 244a and heuristics and metadata 244b. In order to support the functions described herein, in some implementations, the congestion notification aggregator 245 includes a set of instructions 245a and heuristics and metadata 245b. In order to support the functions described herein, in some implementations, the time-smoothing module 246 includes a set of instructions 246a and heuristics and metadata 246b.

Figure 6:
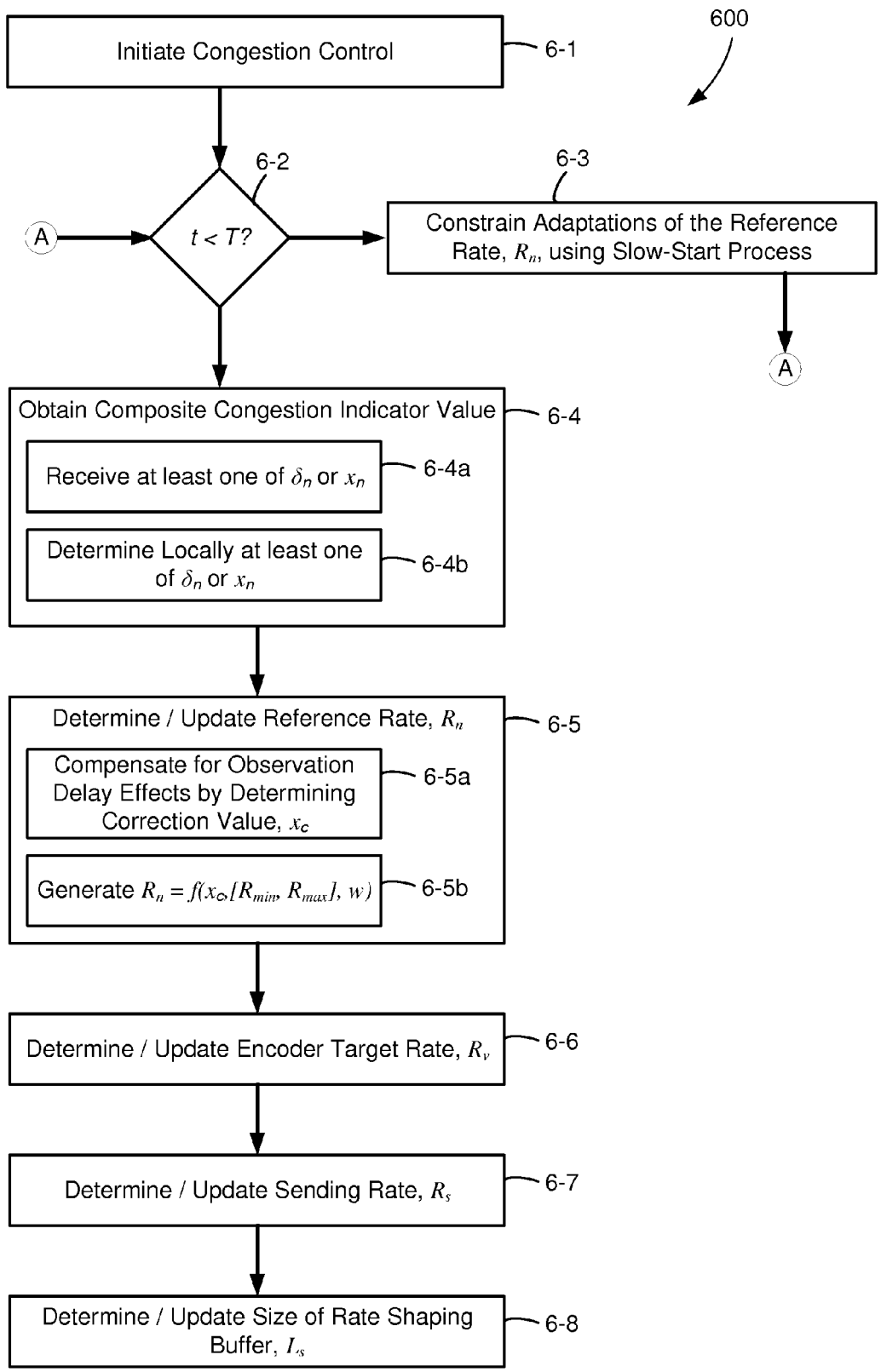
FIG. 6 is a flowchart representation of a transmitter method of congestion control in accordance with some implementations.

FIG. 6 is a flowchart representation of a transmitter method 600 of congestion control in accordance with some implementations. In some implementations, the method 600 is performed by a network node that is configured to at least one of transmit and receive data. Briefly, the method 600 includes obtaining a composite congestion indicator value ($\delta_n$ or $x_n$) associated with multiple types of network congestion indicators, and determining a reference rate $R_n$ based on a function of the composite congestion indicator value ($\delta_n$ or $x_n$). In some implementations, the reference rate $R_n$ is representative of a baseline transmission rate from the first device that at least partially mitigates network congestion indicated by the composite congestion indicator value ($\delta_n$ or $x_n$).

As represented by block 6-1, the method 600 includes initiating congestion control in response to receiving a congestion report or detecting congestion. As represented by block 6-2, the method 600 includes determining whether or not the congestion control process is within a time horizon T of an initiation period (e.g., current time t<7), during which statistically robust data characterizing the reported or detected congestion is obtained. If the process is within the time horizon T ("Yes" path from block 6-2), as represented by block 6-3, the method 600 includes regulating the reference rate $R_n$ to increase at no more than a slow-start rate $R_{ss}$ at time t. In some implementations, regulating the reference rate $R_n$ includes determining both $R_n$ (as described below with reference to blocks 6-4 and 6-5) and $R_{ss}$, and selecting the smaller of the two values when the congestion control process is within the time horizon T. In some implementations, the slow-start rate $R_{ss}$ is provided by equation (3) as follows:

$$R_{ss}(t) = R_{min} + \frac{t - t_0}{T}(R_{max} - R_{min}) \quad (3)$$

With reference to equation (3), to is the start time of a video stream. On the other hand, if the process has past the time horizon T ("No" path from block 6-2), as represented by block 6-4, the method 600 includes obtaining a composite congestion indicator value $\delta_n$ or $x_n$). For example, as represented by block 6-4a, obtaining a composite congestion indicator value includes receiving a composite congestion indicator value $\delta_n$ and/or a time-smoothed composite congestion indicator value $x_n$ in response to a data transmission from the transmitter. More generally, obtaining the composite congestion indicator value includes receiving the composite congestion indicator value in response to a data transmission from a first device. In some implementations, obtaining the composite congestion indicator value includes receiving the composite congestion indicator from a second device configured to receive data transmissions from the first device. In other example, as represented by block 6-4b, obtaining a composite congestion indicator value includes determining a composite congestion indicator value $\delta_n$ and/or a time-smoothed composite congestion indicator value $x_n$ in response to a data transmission from the transmitter. More generally, obtaining the composite congestion indicator value includes determining an equivalent delay value as a function of the one or more respective delay values. In some implementations, obtaining the composite congestion indicator value includes determining the composite congestion indicator value using a time-smoothing function of the equivalent delay value.

As represented by block 6-5, the method 600 includes determining or updating the reference rate $R_n$ based on a function of the composite congestion indicator value $\delta_n$ or $x_n$). In some implementations, as represented by block 6-5a, determining or updating the reference rate $R_n$ includes compensating for observation delay effects by determining a delay correction value $x_c$. For example, in some implementations a delay correction value is determined using a linear prediction function, as provided in equation (4) as follows:

$$x_c = x(t) + \frac{x(t) - x(t - \lambda)}{\lambda}\tau_o \quad (4)$$

In equation (4), $\lambda$ is a timestamp difference between two consecutive video packets. The prediction parameter $\tau_o$ can be viewed as a reference time lag for the delay correction determination. Subsequently, as represented by block 6-5b, the reference rate $R_n$ is generated as a function of delay correction value $x_c$, the dynamic range [$R_{min}$, $R_{max}$] associated with the video stream, and the priority weight w in accordance with equation (5) as follows:

$$R_n = R_{min} + w\frac{R_{max} - R_{min}}{x_c}x_{ref} \quad (5)$$

In equation (5), $x_{ref}$ is a reference congestion signal. The reference congestion signal $x_{ref}$ is typically chosen as the expected one-way propagation path delay, so the maximum rate of $R_{max}$ can be achieved with an empty queue. The combination of w and $x_{ref}$ determines how sensitive the rate adaptation process is to fluctuations in the composite congestion signal. The reference rate $R_n$ is thus constrained within the dynamic range [$R_{min}$, $R_{max}$].

The transmitter does not need explicit knowledge of the queue management scheme utilized by the network. Rather, as described herein, the transmitter reacts to an aggregation of the congestion indications via the composite congestion signal $\delta_n$ or $x_n$).

As represented by block 6-6, the method 600 includes updating the target encoder rate $R_v$.

$$R_v = R_n - \beta_v \frac{L_s}{\tau_v} \quad (6)$$

In equation (6), the first term, being the determined reference rate $R_n$, represents the rate calculated from network congestion feedback alone. The second term $$\beta_v \frac{L_s}{\tau_v}$$

represents the influence of the rate shaping buffer. A large rate shaping buffer nudges the encoder target rate $R_v$ slightly below the reference rate $R_n$. The amount of extra rate offset used to drain the rate shaping buffer within the same time frame of encoder rate adaptation $\tau_v$ is given by $L_s/\tau_v$. The scaling parameter $\beta_v$ can be tuned to balance between the competing goals of limiting the size of the rate shaping buffer and deviating the system from the reference rate $R_n$.

As represented by block 6-7, the method 600 includes updating the outgoing rate $R_s$.

$$R_s = R_n + \beta_s \frac{L_s}{\tau_v} \quad (7)$$

In equation (7), the first term, being the determined reference rate $R_n$, represents the rate calculated from network congestion feedback alone. The second term $$\beta_s \frac{L_s}{\tau_v}$$

represents the influence of the rate shaping buffer. In contrast to the calculation of the target encoder rate $R_v$ described above, a large rate shaping buffer nudges the sending rate $R_s$ slightly above the reference rate $R_n$. The amount of extra rate offset used to drain the rate shaping buffer within the same time frame of encoder rate adaptation $\tau_v$ is given by $L_s/\tau_v$. The scaling parameter $\beta_s$ can be tuned to balance between the competing goals of limiting the size of the rate shaping buffer and deviating the system from the reference rate $R_n$.

As represented by block 6-8, the method 600 includes determining or updating the size of the rate shaping buffer $L_s$. In some implementations, the rate shaping buffer is employed to absorb any instantaneous mismatch between encoder rate output $R_o$ and the sending rate $R_s$. In some implementations, the size of the rate shaping buffer is adjusted in time according to equation (8) as follows:

$$L_s(t) = \max[0, L_s(t-\tau) + (R_o - R_s)\tau] \quad (8)$$

In some implementations, a large rate shaping buffer contributes to higher end-to-end delay, which may harm the performance of real-time media services. Thus, it is often preferable to limit the size of a shaping buffer for real-time media services. As discussed above, the transmitter can deplete the rate shaping buffer by increasing the sending rate $R_s$, or limit its growth by reducing the video encoder target rate $R_v$.

In some implementations, at equilibrium, all data flows sharing a common bottleneck link experience approximately the same one-way delay $d_o$, packet loss ratio $p_L$, and random marking ratio $d_M$. Accordingly, in some implementations, the composite congestion signal can be expressed as:

$$x_o = (1-p_L)d_o + p_M d_M + p_L d_L \quad (9)$$

According to equation (5), the rate at steady state for any stream satisfies equation (10) as follows:

$$\frac{R - R_{min}}{R_{max} - R_{min}} = w\frac{x_{ref}}{x_o} \quad (10)$$

The left hand side of equation (10) can be considered as the relative bandwidth of the stream. When streams bear similar propagation delays and reference delay parameters $x_{ref}$ (typically chosen as the expected propagation delay over the path), the ratio between relative bandwidth of different streams will be dictated by their relative weights {w}. In other words, for streams with low minimum rates $R_{min}$, the rate of each stream is weighted by the dynamic rate range [$R_{min}$, $R_{max}$] together with the corresponding priority weight w.

Figure 7:
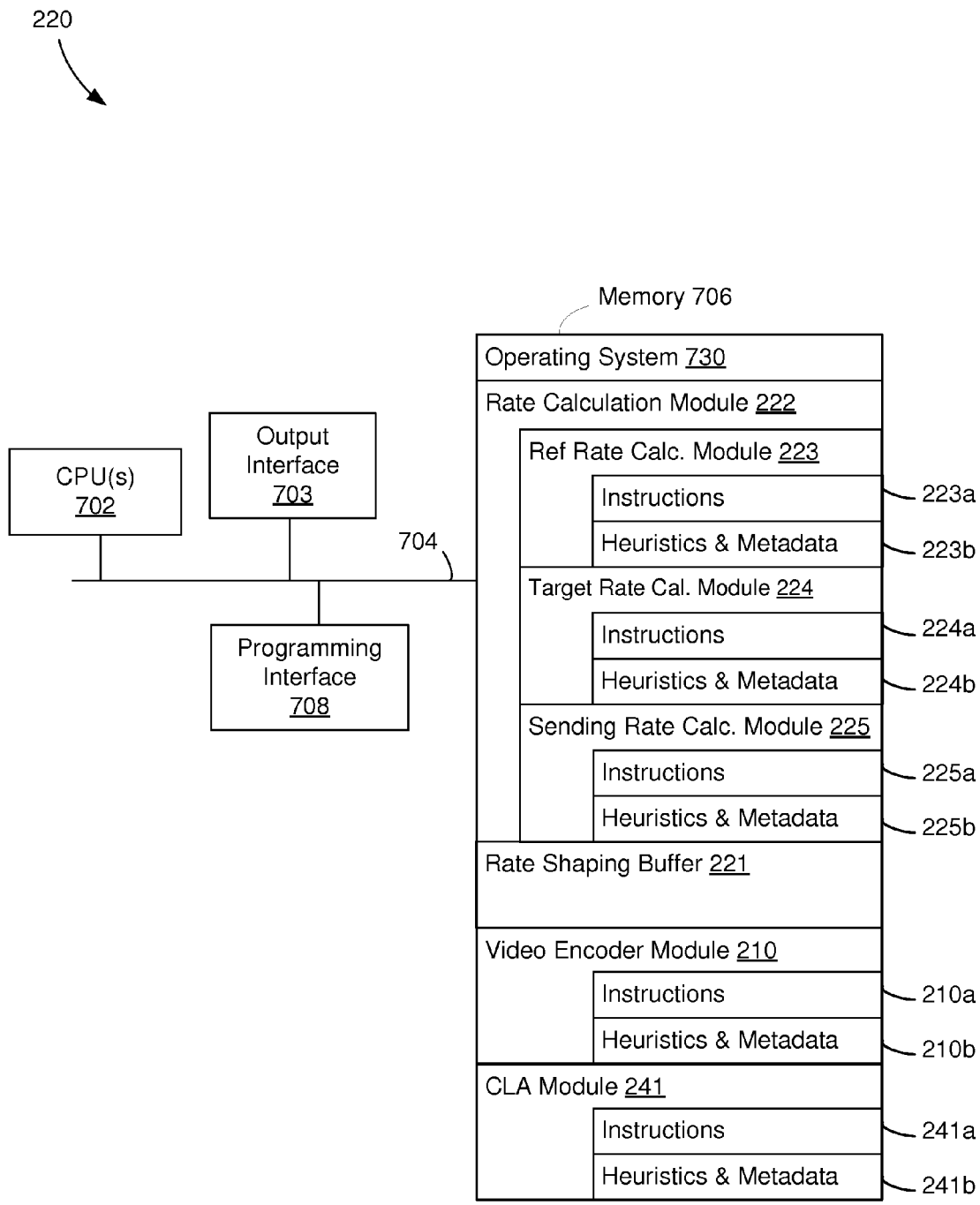
FIG. 7 is a block diagram of a transmitter including a congestion control module in accordance with some implementations.

FIG. 7 is a block diagram of the transmitter 220 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the receiver 240 includes one or more processing units (CPU's) 702, one or more output interfaces 703, a memory 706, a programming interface 708, and one or more communication buses 704 for interconnecting these and various other components.

In some implementations, the communication buses 704 include circuitry that interconnects and controls communications between system components. The memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some implementations, the memory 706 or the non-transitory computer readable storage medium of the memory 706 stores the following programs, modules and data structures, or a subset thereof including an optional operating system 730, the rate calculation module 222, the rate shaping buffer 221, the video encoder 210, and the aforementioned congestion latency analytics module 241. In some implementation, one or more instructions are included in a combination of logic and non-transitory memory.

The operating system 730 includes procedures for handling various basic system services and for performing hardware dependent tasks.

In some implementations, the rate calculation module 222 includes at least one of reference rate calculation module 223, the target rate calculation module 224, and the sending rate calculation module 225. In order to support the functions described herein, in some implementations, the reference rate calculation module 223 includes a set of instructions 223a and heuristics and metadata 223b. In order to support the functions described herein, in some implementations, the target rate calculation module 224 includes a set of instructions 224a and heuristics and metadata 224b. In order to support the functions described herein, in some implementations, the sending rate calculation module 225 includes a set of instructions 225a and heuristics and metadata 225b.

As noted above the video encoder module 210 is configured to encode raw video frames into RTP packets (or the like) towards the target rate $R_v$. In order to support the functions described herein, in some implementations, the sending rate calculation module 225 includes a set of instructions 225a and heuristics and metadata 225b. Similarly, as described above, the congestion latency analytics module 241 includes a set of instructions 241a and heuristics and metadata 241b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that one or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is truer]" or "if [a stated condition precedent is truer]" or "when [a stated condition precedent is truer]" may be construed to mean "upon determining" or "in response to determining" or "in accordance with a determination" or "upon detecting" or "in response to detecting" that the stated condition precedent is true, depending on the context.

What is claimed is:

1. A method of congestion control comprising:
   at a first device configured to at least transmit data over a network, the first device including a processor and non-transitory memory:
   obtaining a composite congestion indicator value, wherein the composite congestion indicator value is representative of a combination of two or more delay values associated with two or more respective types of network congestion indicators;
   determining a reference rate value based on a function of the composite congestion indicator value, wherein the reference rate value is representative of a baseline transmission rate from the first device that at least partially mitigates network congestion indicated by the composite congestion indicator value;
   determining a target encoder rate value based on a function of the reference rate value and one or more performance constraint values of at least one of a data source or a data service provided over the network; and
   providing the target encoder rate value to a video encoder in order to adjust the encoding rate of the video encoder.

2. The method of claim 1, wherein the reference rate value is constrained by one or more performance constraint values of at least one of the data source and the data service.

3. The method of claim 1, further comprising:
   adjusting a sending rate value of the first device in order to set the sending rate value within a capacity available to the first device from the network, wherein the sending rate value is determined as a function of the reference rate value and one or more performance constraint values.

4. The method of claim 1, wherein the one or more performance constraint values include at least one of a dynamic range associated with a video encoder provided as the data source, a priority weight value, an estimate of expected one-way propagation path delay and an estimate of the size of a rate shaping buffer.

5. The method of claim 1, wherein the one or more performance constraint values include an estimate of the size of a rate shaping buffer.

6. The method of claim 5, wherein the target encoder rate value is less than the reference rate value in proportion to the estimate of the size of the rate shaping buffer.

7. The method of claim 1, wherein an output rate of the video encoder tracks the target encoder rate.

8. The method of claim 1, wherein determining the reference rate value comprises:
   determining a delay correction value using a difference between respective timestamps of a pair of packets associated with a data service; and
   calculating the reference rate value based on a function including the delay correction value.

9. The method of claim 8, wherein the delay correction value is determined using a linear prediction function.

10. The method of claim 1, wherein the two or more types of network congestion indicator values include at least one of an estimate of per-packet drops, an estimate of one way transmission delay, an estimate of round-trip transmission delay, an implicit congestion notification indicator value, or an explicit congestion notification marking.

11. The method of claim 1, wherein obtaining the composite congestion indicator value includes receiving the composite congestion indicator value in response to a data transmission from the first device.

12. The method of claim 11, wherein obtaining the composite congestion indicator value includes receiving the composite congestion indicator from a second device configured to receive data transmissions from the first device.

13. The method of claim 1, wherein obtaining the composite congestion indicator value includes determining an equivalent delay value as a function of the two or more respective delay values.

14. The method of claim 13, wherein obtaining the composite congestion indicator value includes determining the composite congestion indicator value using a time-smoothing function of the equivalent delay value.

15. The method of claim 14, wherein determining the time-smoothing function includes determining an exponential averaging function of the equivalent delay value.

16. The method of claim 1, further comprising:
determining two or more respective delay values associated with two or more types of network congestion indicator values; and
generating a composite congestion indicator value, wherein the composite congestion indicator value is representative of a combination of two or more respective delay values associated with two or more types of network congestion indicator values.

17. The method of claim 16, further comprising transmitting the composite congestion indicator value to a transmitting device.

18. The method of claim 1, wherein the target encoder rate value is less than the reference rate value.

19. Software encoded on a non-transitory memory, the software including instructions that when executed cause a first device to:
obtain a composite congestion indicator value, wherein the composite congestion indicator value is representative of a combination of two or more delay values associated with two or more respective types of network congestion indicators;
determine a reference rate value based on a function of the composite congestion indicator value, wherein the reference rate value is representative of a baseline transmission rate from the first device that at least partially mitigates network congestion indicated by the composite congestion indicator value;
determining a target encoder rate value based on a function of the reference rate value and one or more performance constraint values of at least one of a data source or a data service provided over the network; and
providing the target encoder rate value to a video encoder in order to adjust the encoding rate of the video encoder.

20. A first device comprising:
one or more processors; and
non-transitory memory including one or more module software modules, that when executed by the one or more processors, cause the first device to:
obtain a composite congestion indicator value, wherein the composite congestion indicator value is representative of a combination of two or more delay values associated with two or more respective types of network congestion indicators;
determine a reference rate value based on a function of the composite congestion indicator value, wherein the reference rate value is representative of a baseline transmission rate from the first device that at least partially mitigates network congestion indicated by the composite congestion indicator value;
determining a target encoder rate value based on a function of the reference rate value and one or more performance constraint values of at least one of a data source or a data service provided over the network; and
providing the target encoder rate value to a video encoder in order to adjust the encoding rate of the video encoder.

\* \* \* \* \*